(12) United States Patent
Polykretis et al.

(10) Patent No.: US 12,070,858 B2
(45) Date of Patent: Aug. 27, 2024

(54) NEUROMORPHIC SMOOTH CONTROL OF ROBOTIC ARMS (71) Applicant: Accenture Global Solutions Limited, Dublin (IE)

(72) Inventors: Ioannis Polykretis, Piscataway, NJ (US); Lazar Supic, East Palo Alto, CA (US); Alexandria Emily Pabst, Merced, CA (US); Lavinia Andreea Danielescu, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 275 days.

(21) Appl. No.: 17/752,457

(22) Filed: May 24, 2022

(65) Prior Publication Data
US 2023/0029494 A1  Feb. 2, 2023

(30) Foreign Application Priority Data
Aug. 2, 2021  (GR) .............................. 20210100523

(51) Int. Cl.
*B25J 9/00* (2006.01)
*B25J 9/04* (2006.01)
*B25J 9/16* (2006.01)
*G06N 3/049* (2023.01)

(52) U.S. Cl.
CPC .............. *B25J 9/161* (2013.01); *B25J 9/042* (2013.01); *B25J 9/163* (2013.01); *B25J 9/1664* (2013.01); *G06N 3/049* (2013.01)

(58) Field of Classification Search
CPC ... B25J 9/161; B25J 9/042; B25J 9/163; B25J 9/1664; G06N 3/049; G06N 3/063; G05B 13/027; G05B 2219/39271
See application file for complete search history.

(56) References Cited

U.S. PATENT DOCUMENTS

| 10,579,925 | B2* | 3/2020 | Kasabov | G06N 3/088 |
| 2019/0042915 | A1* | 2/2019 | Akin | G06N 3/065 |
| 2019/0217467 | A1 | 7/2019 | Passot et al. | |

OTHER PUBLICATIONS

Extended Search Report in European Appln. No. 22187915.8, dated Dec. 23, 2022, 9 pages.

(Continued)

*Primary Examiner* — Ian Jen
(74) *Attorney, Agent, or Firm* — Polsinelli P.C.

(57) ABSTRACT

This document describes neuromorphic controllers. In one aspect, a method for controlling one or more joints of a robotic arm includes receiving, by neuromorphic controller comprising a spiking neural network (SNN), a target value of a joint control variable for a joint of the robotic arm. The SNN includes two position proprioceptor neurons, two-speed proprioceptor neurons, a presynaptic inhibitory neuron, an extensor motor neuron, and a flexor motor neuron. The neuromorphic controller updates an actual value of the joint control variable for the joint of the robotic arm based on the target value of the joint control variable. The updating includes generating, by one of the two position proprioceptor neurons, the first spikes to one of the extensors motor neurons or the flexor motor neuron based on a difference between the actual value of the joint control variable and the target value of the joint control variable.

20 Claims, 5 Drawing Sheets (56) References Cited

OTHER PUBLICATIONS

Buchanan, "Learning a single limb multijoint coordination pattern: the impact of a mechanical constraint on the coordination dynamics of learning and transfe," Ex. Brain Research, 2004, 156:39-54.
cnvrg.io [online], "Basic Guide to Spiking Neural Networks for Deep Learning," available on or before Jun. 3, 2021 via Internet Archive: Wayback Machine URL<https://web.archive.org/web/20210603120221/https://cnvrg.io/spiking-neural-networks/>, retrieved on Aug. 22, 2022, retrieved from URL<https://cnvrg.io/spiking-neural-networks/>, 17 pages.
Fink et al., "Presynaptic inhibition of spinal sensory feedback ensures smooth movement," Nature, Apr. 30, 2014, 509:43-48.
Glatz et al., "Adaptive motor control and learning in a spiking neural network realised on a mixed-signal neuromorphic processor," Presented at Proceedings of the 2019 International Conference on Robotics and Automation (ICRA), Montreal, CA, May 20-24, 2019, 9631-9637.
Konczak et al., "The development toward stereotypic arm kinematics during reaching in the first 3 years of life," Ex. Brain Research, 1997, 117:346-354.
Linares-Barranco et al., "ED-BioRob: A Neuromorphic Robotic Arm With FPGA-Based Infrastructure for Bio-Inspired Spiking Motor Controller," Front. Neurobiotics, Nov. 30, 2020, 14:590163, 12 pages.
Sezener et al., "A rapid and efficient learning rule for biological neural circuits," bioRxiv, Mar. 12, 2021, 29 pages.
Stagsted et al., "Event-based PID controller fully realized in neuromorphic hardware: a one DoF study," Presented at Proceedings of the 2020 IEEE/RSJ International Conference on Intelligent Robots and Systems (IROS), Las Vegas, NV, USA, Oct. 25-29, 2020, 10939-10944.
Stagsted et al., "Towards neuromorphic control: A spiking neural network based PID controller for UAV," Presented at Proceedings of Robotics: Science and Systems 2020, Corvalis, Oregon, USA, Jul. 12-16, 2020, 8 pages.
Zahra et al., "A Neurorobotic Embodiment for Exploring the Dynamical Interactions of a Spiking Cerebellar Model and a Robot Arm During Vision-Based Manipulation Tasks," Int. J. Neural Systems, May 18, 2021, 32(8):2150028, 17 pages.
Zaidel et al., "Neuromorphic NEF-Based Inverse Kinematics and PID Control," Front. Neurorobotics, Feb. 3, 2021, 15:631159, 12 pages.
Zhao et al., "Closed Loop Spiking Control on a Neuromorphic Processor Implemented on the iCub," IEEE Journal on Emerging and Selected Topics in Circuits and Systems, Dec. 2020, 10(4):546-556.

* cited by examiner

NEUROMORPHIC SMOOTH CONTROL OF ROBOTIC ARMS

CROSS-REFERENCE TO RELATED APPLICATIONS

This application claims the benefit of Greek Patent Application No. 20210100523, filed Aug. 2, 2021, which is incorporated herein by reference.

FIELD

This specification generally relates to controllers for robotic arms.

BACKGROUND

Robotic arms are used for many purposes, including performing tasks in industrial facilities and performing everyday tasks to assist people (e.g., by assisting with eating, drinking, etc.). A robotic arm typically includes links that are connected by joints that enable translational and/or rotational movement of the links and an end effector (e.g., tool or gripper) for performing the tasks. Controllers can control the motion of the joints to move the links and the end effector into target positions.

SUMMARY

This specification generally describes neuromorphic controllers that provide smooth control of robotic arms. The control can be realized using a spiking neural network (SNN), with control models that imitate experimentally identified neuronal connectomes that allow animals and humans to achieve smooth reaching movements. Being biologically plausible, the control models inherit not only the potential to replicate the dynamics of human reaching movements, but also the minimal complexity of their biological counterpart.

Smooth control should be used when robotic arms need to interact with humans, e.g., for industrial robotic arms and assistive robotic arms. The smooth control for industrial robotic arms ensures the safety of the workers that work alongside and/or interact with the robotic arms. The smooth control provides the same safety while also making the user experience more pleasant when used to control assistive robotic arms. The prolonged life expectancy of robot motors when smooth control is employed is an additional advantage of the robotic arm control techniques described in this document.

Robotic arm controllers can exploit neuronal ensembles to approximate the differential equations used in classical control theory and achieve robotic arm control. The techniques described in this document exploit not only the units of brain computation, i.e., neurons, but also the connectome of brain controllers to tackle specific tasks. In this way, the robotic arm controllers can achieve similar results with less complicated SNNs, resulting in improvements in energy efficiency, latency, and explainability. For example, the SNNs described in this document are substantially smaller and more efficient than neuron ensembles that typically require thousands of neurons per ensemble. The controllers can be applied to robotic arms to allow for smooth control of discrete and continuous movements. The controllers can be used for industrial robot arms, patient-assistive arms, and other types of robotic arms or other types of robots, to address safety and user-friendliness.

Neuromorphic controllers described in this document are based on the neuronal connectome of some animals (e.g., primates and rodents) and humans into an SNN to control the rotation of a single joint. The neuromorphic controller can be used as a building block to scale up to the multiple joints of real-world robotic arms, e.g., robotic arms with multiple joints providing multiple degrees of freedom such as a six degree of freedom robotic arm. The neuromorphic controllers of multiple joints of a robotic arm can be coordinated to improve the dynamics of the movements of the robotic arm, e.g., to make the movements smoother and similar to that of humans, and can enable fast adaption of the robotic arm to a new environment.

According to some implementations, a method for controlling one or more joints of a robotic arm can include receiving, by a neuromorphic controller comprising a spiking neural network (SNN), a target value of a joint control variable for a joint of the robotic arm. The SNN includes position control proprioceptor neurons, speed control proprioceptor neurons, an extensor motor neuron, and a flexor motor neuron. The neuromorphic controller generates an actuation signal that causes the joint of the robotic arm to move based on a difference between the target value of the joint control variable and an actual value of the joint control variable. Generating the actuation signal includes generating, by one of the position control proprioceptor neurons, first spikes to one of the extensor motor neuron or the flexor motor neuron based on a difference between the actual value of the joint control variable and the target value of the joint control variable, generating, by one of the speed control proprioceptor neurons, second spikes to one of the extensor motor neuron or the flexor motor neuron based on whether a change in speed of movement of the joint of the robotic arm is positive or negative, and generating a value of the actuation signal based on spiking activity of the extensor motor neuron or the flexor motor neuron. The actuation signal is output to the joint to cause the joint to move.

Implementations can include one or more of the following features. In some aspects, generating, by one of the position control proprioceptor neurons, a first spike to one of the extensor motor neuron or the flexor motor neuron based on a difference between the actual value of the joint control variable and the target value of the joint control variable includes determining, by a first position control proprioceptor neuron, that the actual value of the joint control variable is less than the target value of the joint control variable and, in response, generating the first spikes to the extensor motor neuron; or determining, by a second position proprioceptor neuron, that the actual value of the target control variable is greater than the target value of the joint control variable and, in response, generating the first spikes to flexor motor neuron. A quantity of the first spikes can be based on a magnitude of the difference between the actual value of the joint control variable and the target value of the joint control variable.

In some aspects, generating, by one of the speed control proprioceptor neurons of the SNN, the second spikes to one of the extensor motor neuron or the flexor motor neuron based on whether a change in speed of movement of the joint of the robotic arm is positive or negative includes determining, by a first speed control proprioceptor neuron, that the change in speed of movement of the joint of the robotic arm is positive and, in response, generating the second spikes to the flexor motor neuron; or determining, by a second speed control proprioceptor neuron, that the change in speed of movement of the joint of the robotic arm is negative and, in response, generating the second spikes to the extensor motor neuron.

In some aspects, updating the actual value of the joint control variable based on spiking activity of the extensor motor neuron or the flexor motor neuron includes reducing a speed of movement of the joint as the actual value of the target control variable joint approaches to the target value of the target control variable.

Some aspects adjusting, by a presynaptic inhibitory (PSI) neuron of the SNN, at least one of (i) a first connection weight between the first position control proprioceptor neuron and the extensor motor neuron or (ii) a second connection weight between the second position control proprioceptor neuron and the flexor motor neuron. The PSI neuron can adjust the first connection weight and/or the second connection weight based on a difference between the target value of the joint control variable and the actual value of the joint control variable.

Some aspects can include updating, by an additional neuromorphic controller for an additional joint of the robotic arm, an additional actual value of an additional joint control variable of the additional joint based on a target value of the additional joint control variable, on whether a change in speed of movement of the additional joint of the robotic arm is positive or negative, and at least one of (i) spikes generated by the extensor motor neuron of the neuromorphic controller or (ii) spikes generated by the flexor motor neuron of the neuromorphic controller. Some aspects include coordinating, by the additional neuromorphic controller, movement of the additional joint based on movement of the joint. Some aspects include determining the target value of the joint control variable of the joint of the robotic arm based on user input received from one of (i) a joystick, (ii) a speech recognition image, or (iii) a camera.

The methods in accordance with the present disclosure can include any combination of the aspects and features described herein. That is, methods in accordance with the present disclosure are not limited to the combinations of aspects and features specifically described herein, but also may include any combination of the aspects and features provided.

Particular embodiments of the subject matter described in this specification can be implemented to realize one or more of the following advantages. Using neuromorphic controllers that imitate neuronal connectomes of humans and animals enables smooth control of the various links of robotic arms, including, for example, gradually increasing the speed during movement initiation and timely decreasing it as the joint approaches its target arrangement, e.g., target angle of a revolute joint or target length of a prismatic joint. This smooth motion ensures the safety of people that work alongside and/or interact with robotic arms, improves the user experience for people who interact with assistive robotic arms, and increases life expectancy and reduces failures in robot motors. The control models implemented using SNNs described in this document improve energy efficiency, latency, and explainability relative to conventional control models. Coordinating the motion of multiple joints using neuromorphic controllers improves the quality of movement of the overall robotic arm, e.g., by providing smoother motion, reducing overshoots of links of the arm, and leveraging the inertial motion of primary joints for the movement of subordinate joints to imitate the motion of human arms.

The inclusion of speed control proprioceptor neurons enables the neuromorphic controller to provide smooth motion by confining the speed at which a variable for the joint changes (e.g., angle for revolute joints or length for prismatic joints) within a specific range. The inclusion of a presynaptic inhibitory neuron further enhances this smooth motion by adjusting presynaptic weights of the motor neurons in a range that reduces or prevents overshoots, while allowing for accurate correction of small differences between targets and actual arrangements.

The details of one or more implementations of the present disclosure are set forth in the accompanying drawings and the description below. Other features and advantages of the present disclosure will be apparent from the description, drawings, and from the claims.

BRIEF DESCRIPTION OF THE DRAWINGS

Like reference numbers and designations in the various drawings indicate like elements.

DETAILED DESCRIPTION

Figure 1:
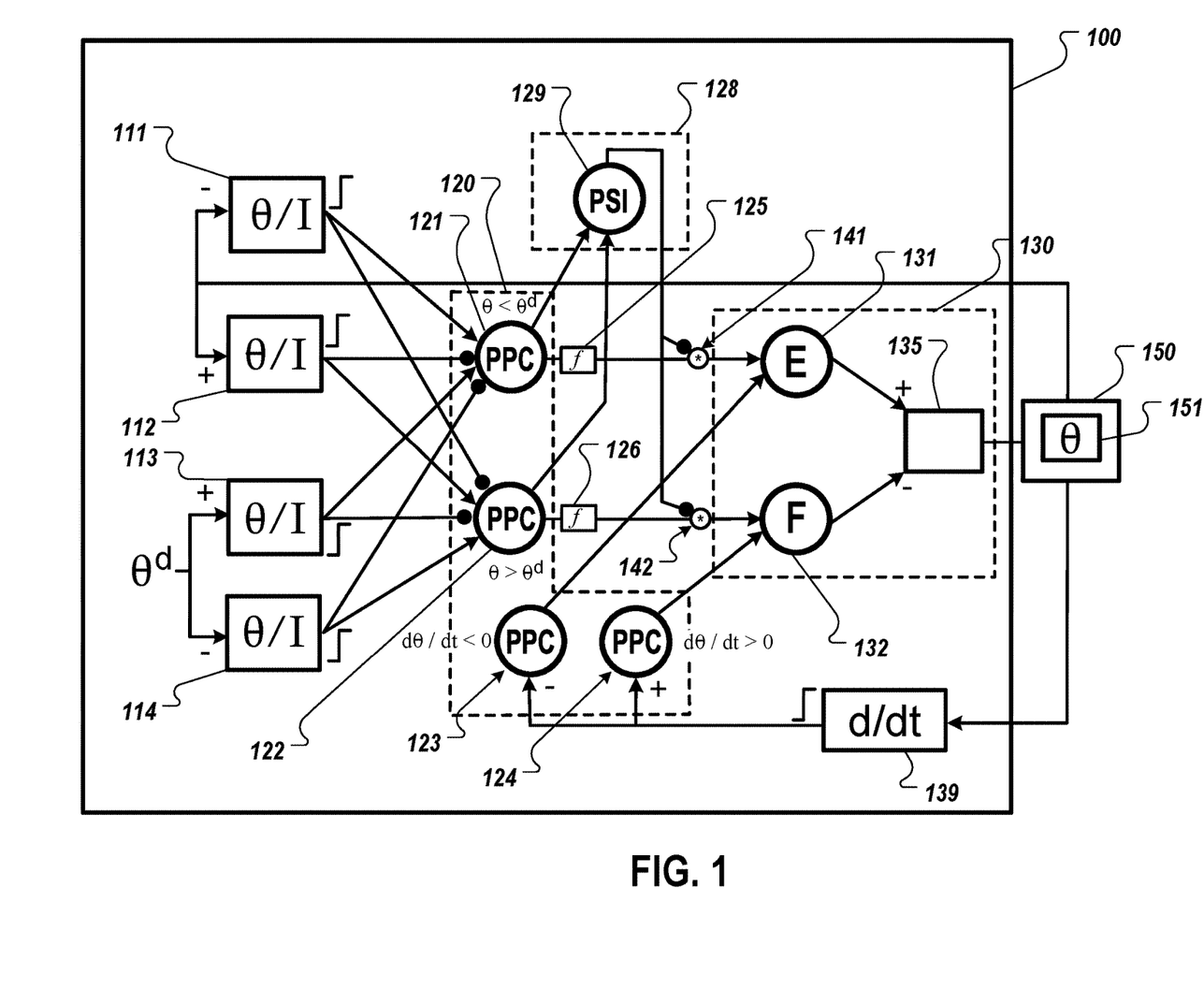
FIG. 1 depicts an example neuromorphic controller for controlling a joint of a robotic arm.

FIG. 1 depicts an example neuromorphic controller 100. The neuromorphic controller 100 can be configured to control a joint 150 of a robotic arm or other type of robot or moveable object, such as objects with a hinge or a vehicle. For example, as the neuromorphic controller 100 can dictate any scalar amount, the neuromorphic controller 100 can be used to control the linear or angular speed of a wheeled or flying vehicle. For brevity, the description that follows is in terms of joints of robotic arms.

In general, a robotic arm can include multiple links and a mechanical joint between each pair of adjacent links that controls the movement of the adjacent links relative to one another. For example, a robotic arm can include two links with a revolute joint that controls an angle between the two joints. In another example, a robotic arm can include three links with a revolute joint between each pair of links. In yet another example, a robotic arm can include two links with a prismatic joint that provides linear sliding movement between the two links.

The neuromorphic controller 100 can be used to control a joint 150 of a single joint robotic arm or a joint of a robotic arm that has multiple joints. For example, a control system can include an individual neuromorphic controller for each of one or more joints of a robotic arm. As described below, the controller output of two or more neuromorphic controllers can be coordinated to improve the control smoothness of adjacent links and provide human-like arm movements.

The neuromorphic controller 100 can be implemented as a spiking neural network (SNN). A spiking neural network is an artificial neural network that uses biologically realistic models of neurons to closely imitate natural neural networks. The neuromorphic controller 100 can be implemented using special-purpose circuitry, e.g., special-purpose machine learning circuits. For example, the neuromorphic controller 100 can be implemented using a neuromorphic processor, e.g., a neuromorphic research chip, such as Intel's Loihi chip, or a neural network processor, such as BrainChip's Akida™ chip. In such special-purpose circuitry, the neurons can be implemented as hardware neuron cores that output spikes based on voltage or current inputs to the neurons. The spikes can be signals, e.g., messages, sent between neurons and, in some cases, can carry a message payload. A spike can be a voltage signal having a positive voltage level and a short duration, e.g., having a spike width of about 1 millisecond.

In some implementations, the neurons used for the neuromorphic controller 100 follow the one-step leaky-integrate-and-fire (LIF) dynamics (each presynaptic spike directly increases the membrane voltage of the postsynaptic neuron). However, the model could be effectively implemented with non-leaky neurons (IF), two-step LIF neurons (each presynaptic spike generates a current, which is in turn integrated into the voltage of the postsynaptic neuron's membrane potential) or Izhikevich neurons.

The voltage, or a voltage value that represents a voltage in software if the SNN is modeled in software, can be increased at the neuron upon receipt of each spike until a threshold is reached using the LIF dynamics. When the threshold is reached, that neuron can fire, e.g., output spike signals to a next neuron in the network. Connection weights at the input to a neuron can control the increase in the voltage value at the neuron caused by each spike.

The neuromorphic controller 100 can receive a desired target value of a joint control variable (labeled as $\theta^d$ in the figures) and determines, e.g., computes, an actuation signal that is provided to an actuator of the joint 150 being controlled by the neuromorphic controller 100. The joint control variable can be any scalar amount, such as the angle of a revolute joint, or the length of a prismatic joint, or the angular speed/linear speed of a motor.

In some implementations, the target value of the joint control variable is determined based on user input. For example, the neuromorphic controller 100 or another component can determine the target value for the joint control variable for the joint 150 based on input from a user through a joystick, using voice input through a speech recognition engine, or from a camera using object recognition. The control of the joint 150 is realized by comparing the actual value of the joint control variable (labeled as $\theta$ in the figures) with the target value of the joint control variable ($\theta^d$).

The actuation signal can correspond to the actual value of the joint control variable and/or represent a change to the actual value of the joint control variable. The neuromorphic controller 100 can continuously determine and output the actuation signal to move the joint 150 from a current arrangement (e.g., current position, length, or angle) to the target arrangement corresponding to the target value of the joint control variable. For example, motor neurons 131 and 132 of the neuromorphic controller 100, which are described in detail below, can generate spiking activity (e.g., a series of spikes) that are translated into torques that represent changes in the actual value of the joint control variable. In this example, the actuation signal that the neuromorphic controller 100 sends to the joint 150 can be the torques (or values that represent the torques) that are generated based on the spiking activity.

A robot controller can provide, to the neuromorphic controller 100, target values of the joint control variable, e.g., in a sequence, to guide the neuromorphic controller 100 to provide the desired robot arm movement. The neuromorphic controller 100 uses the target value of the joint control variable and the actual value of the control variable to control the joint 150 in accordance with the target values received from the robot controller. The neuromorphic controller 100 can receive the actual value of the joint control variable from a sensor 151 that measures the actual value of the joint control variable, e.g., continuously.

The neuromorphic controller 100 includes several types of neurons that make up the SNN. In particular, the neuromorphic controller 100 includes position control proprioceptor neurons 121 and 122, speed control proprioceptor neurons 123 and 124, a presynaptic inhibitory (PSI) neuron 129, and motor neurons 131 and 132. The presynaptic inhibitory neuron 129 is optional and can be used to prevent, or reduce the amount by which, the joint 150 overshoots its target arrangement as described below.

The neuromorphic controller 100 includes current converter modules (CCMs) 111-114. The CCMs 111 and 112 encode the actual value of the joint control variable into current values. The CCMs 111 and 112 can receive the actual value of the joint control variable from a sensor 151 that measures that actual value at the joint 150.

Similarly, the CCMs 113 and 114 convert the target value of the joint control variable into current values. The current values can be actual electrical currents when the SNN of the neuromorphic controller 100 is implemented using hardware components, e.g., analog components, or values that represent currents when the SNN is implemented in software.

The CCMs 111-114 generate current pulse outputs based on their respective inputs. The current pulse outputs of the CCMs 111-114 stimulate the neurons of the network, driving their spiking activity.

The neuromorphic controller 100 includes two CCMs for each value of the joint control variable to encode both positive and negative values of current values and target values of the joint control variable. For that reason, the two values are provided to their two respective CCMs with opposite signs. The CCMs 111-114 can be governed by a rectified linear activation function (ReLU)-like transfer function. That is, the CCMs 111-114 can output a value of zero when its input argument is negative, while outputting linear values for positive input arguments, returning a proportion of the input argument. The current pulse output of a CCM is proportional, e.g., directly proportional, to the input of the CCM when the input is non-negative. Otherwise, the output of the CCM is zero. In that way, the activity in a pair of CCMs (e.g., CCM 111 and CCM 112) is mutually exclusive. For example, when the actual value of the joint control variable is positive, the CCM 111 is inactive, while the CCM 112 is active, and vice versa. As the current pulse outputs are proportional to the input of the CCM, the current pulse outputs of the CCM 111 are proportional to negative actual values of the joint control variable and the current pulse outputs of the CCM 112 are proportional to positive actual values of the joint control variable.

Similarly, when the target value of the joint control variable is positive, the CCM 114 is inactive, while the CCM 113 is active, and vice versa. In particular, the current pulse outputs of the CCM 114 are proportional to negative target values of the joint control variable and the current pulse outputs of the CCM 113 are proportional to positive target values of the joint control variable.

The output current pulses of each CCM are provided as input to position control proprioceptor (PPC) neurons 121 and 122. The position control PPC neurons 121 and 122 are part of a sensing stage 120 of the neuromorphic controller 100 that also includes speed control PPC neurons 123 and 124. The PPC neurons 121-124 can each be implemented as spiking neurons in an SNN. The PPC neurons 121-124 are also referred to as PPCs for brevity. In an SNN implementation, the position control PPC neuron 121 may only spike, e.g., output or fire spikes, when the actual value of the joint control variable is less than the target value of the joint control variable. For example, if the actual angle of the joint 150 is less than the target angle for the joint 150, the position control PPC neuron 121 can output spikes. If the actual value of the joint control variable is equal to or greater than the target value of the joint control variable, the position control PPC neuron 121 will not output spikes.

Similarly, the PPC neuron 122 may only spike when the actual position of the joint 150 is greater than the target position. For example, if the actual angle of the joint 150 is greater than the target angle for the joint 150, the position control PPC neuron 122 can output spikes. If the actual value of the joint control variable is equal to or less than the target value of the joint control variable, the position control PPC neuron 122 will not output spikes.

The sign of the connections from each CCM 111-114 is selected to dictate the following behavior of the position control PPC neurons 121 and 122. The goal of these two PPC 121 and 122 is to fire spikes in a mutually exclusive manner, with spikes from PPC 121 indicating that the actual value of the joint control variable is less than the target value of the joint control variable, while the spikes of PPC 122 indicate that the actual value of the joint control variable is greater than the target value of the joint control variable. Notably, the magnitude of these differences may not be encoded in the spiking activity itself, e.g., the presence of spikes in each neuron, but in the firing rate of each neuron, e.g., the number of spikes per unit time. In this example, it will always be PPC 121 firing if the actual value of the joint control variable is x less than the target value or 2x less than the target value, but it will fire twice as many spikes, e.g., per unit time, when the actual value is 2x less than the target value. That is, the rate of spikes is based on, e.g., proportional to, the magnitude of the difference between the target value of the joint control variable and the actual value of the joint control variable.

To achieve this behavior, the sign of the connections from the CCMs 112 and 113 to the PPCs 121 and 122 are selected as follows. In FIG. 1, a connection with an arrow indicates an excitatory connection while a connection with a dot indicates an inhibitory connection. CCM 113 excites PPC 121, while CCM 112 inhibits PPC 121. Therefore, when the target value of the joint control variable is positive making CCM 113 active and the actual value is positive making CCM 112 active but less than the target value, the overall current value stimulating PPC 121 will be positive. For example, the overall current value input to the PPC 121 can be based on the difference between the excitatory current value input from CCM 113 and the inhibitory current value input from CCM 112. This overall positive input causes PPC 121 to output spikes (indicating that $\theta$ is less than $\theta^d$) at a rate that is based on, e.g., proportional to, the magnitude of the difference is (how much less is $\theta$ than $\theta^d$). At the same time, the same CCMs 112 and 113 excite and inhibit PPC 122, respectively. In that way, the overall current value stimulating PPC 122 will be negative (e.g., the difference between the excitatory current value input from CCM 112 and the inhibitory current value input from CCM 113), and no spikes will be elicited there (indicating that $\theta$ is not greater than $\theta^d$). This ensures the mutually exclusive activation of PPC 121 and 122.

CCM 113 inhibits PPC 122, while CCM 112 excites PPC 122. Therefore, when the target value of the joint control variable is positive, making CCM 113 active, and the actual value is positive making CCM 112 active but greater than the target, the overall input to PPC 122 will be positive. For example, the overall current value input to the PPC 122 can be based on the difference between the excitatory current value input from CCM 112 and the inhibitory current value input from CCM 113. This overall positive input causes PPC 122 to output spikes (indicating that $\theta$ is greater than $\theta^d$) at a rate that is based on, e.g., proportional to, the magnitude of the difference (how much greater is $\theta$ than $\theta^d$). At the same time, the exact same CCM 112 and 113 inhibit and excite PPC 121, respectively. In that way, the overall current value stimulating PPC 121 will be negative (e.g., difference between the excitatory current value input from CCM 113 and the inhibitory current value input from CCM 112), and no spikes will be elicited there (indicating that $\theta$ is not less than $\theta^d$). This ensures the mutually exclusive activation of PPC 121 and 122.

The connectivity of the other two CCMs 111 and 114 to the PPC 121 and 122 can be selected using the same rationale, when considering negative actual and target values for the joint control variable. CCM 111 excites PPC 121, while CCM 114 inhibits PPC 121. Therefore, when the target value of the joint control variable is negative making CCM 114 active and the actual value is negative making CCM 111 active but is less than the target value, the overall current value stimulating PPC 121 will be positive. For example, the overall current value input to the PPC 121 can be based on the difference between the excitatory current value input from CCM 111 and the inhibitory current value input from CCM 114. This overall positive input causes PPC 121 to output spikes (indicating that $\theta$ is less than $\theta^d$) at a rate that is based on, e.g., proportional to, the magnitude of the difference is (how much less is $\theta$ than $\theta^d$). At the same time, the same CCMs 114 and 111 excite and inhibit PPC 122, respectively. In that way, the overall current value stimulating PPC 122 will be negative (e.g., the difference between the excitatory current value input from CCM 114 and the inhibitory current value input from CCM 111), and no spikes will be elicited there (indicating that $\theta$ is not greater than $\theta^d$). This ensures the mutually exclusive activation of PPC 121 and 122.

CCM 111 inhibits PPC 122, while CCM 114 excites PPC 122. Therefore, when the target value of the joint control variable is negative, making CCM 114 active, and the actual value is positive making CCM 111 active but greater than the target, the overall input to PPC 122 will be positive. For example, the overall current value input to the PPC 122 can be based on the difference between the excitatory current value input from CCM 114 and the inhibitory current value input from CCM 111. This overall positive input causes PPC 122 to output spikes (indicating that $\theta$ is greater than $\theta^d$) at a rate that is based on, e.g., proportional to, the magnitude of the difference (how much greater is $\theta$ than $\theta^d$). At the same time, the exact same CCM 114 and 111 inhibit and excite PPC 121, respectively. In that way, the overall current value stimulating PPC 121 will be negative (e.g., difference between the excitatory current value input from CCM 111 and the inhibitory current value input from CCM 114), and no spikes will be elicited there (indicating that $\theta$ is not less than $\theta^d$). This ensures the mutually exclusive activation of PPC 121 and 122.

The indication of whether the actual value of the joint control variable is less than or greater than the target value is used to update the actual value towards the target value. For that reason, the position control PPCs 121 and 122 are connected to their respective motor neurons, the extensor motor neuron 131 and the flexor motor neuron 132. These motor neurons 131 and 132 are part of an actuation stage 130 of the neuromorphic controller 100.

The extensor motor neuron 131 integrates the output spikes of PPC 121, indicating that the actual value of the joint control variable is less than the target value, into its spiking activity. That is, the output spikes of PPC 121 cause the extensor motor neuron 131 to output spikes if a sufficient number of outputs spikes reach the extensor motor neuron 131 to satisfy its threshold. More frequent spikes from PPC 121 result in more spikes output by the extensor motor neuron 131. The spikes of the extensor motor neuron 131 cause an increase in the actual value ($\theta$) of the joint control variable to reach the target value ($\theta^d$) of the joint control variable. The output of the extensor motor neuron 131 is connected to an actuation signal generator 135 that translates the spikes to actuation signals, e.g., to torques. The actuation signal generator 135 sends the torques to the joint 150. Therefore, each of the spikes of the extensor motor neuron 131 are translated to an incremental increase of the actual value of the joint control variable.

The flexor motor neuron 132 integrates the output spikes of PPC 122, indicating that the actual value of the joint control variable is greater than the target value, into its spiking activity. That is, the output spikes of PPC 122 cause the flexor motor neuron 132 to output spikes if a sufficient number of outputs spikes reach the flexor motor neuron 132 to satisfy its threshold. More frequent spikes from PPC 122 result in more spikes output by the flexor motor neuron 132. The spikes of the flexor motor neuron 132 decrease the actual value ($\theta$) of the joint control variable to reach the desired value ($\theta^d$). The output of the flexor motor neuron 132 is connected to the actuation signal generator 135, which translates the spikes to actuation signals as described above. Therefore, each of the spikes of the flexor motor neuron 132 are translated to an incremental decrease of the actual value of the joint control variable.

The connections between the position control PPCs 121 and 122 and their respective motor neurons 131 and 132 differ from the other synaptic connections of the network, by incorporating facilitation using facilitating synapses 125 and 126. This means that the synaptic efficacy of the connections is not static, but it increases with each presynaptic spike until saturating at a maximum value. This property is used for these connections to improve the smoothness of the control. When an abrupt change occurs in the target value for the joint control variable, the activity of either of the PPC 121 or 122 increases abruptly as well. In that way, absent facilitation, the abrupt increase would be propagated to the motor neurons 131 and 132 and could cause a sudden and jerky effect on the actual controlled value ($\theta$) of the joint control variable. Incorporating facilitation, this effect is mitigated as follows. The initial, abrupt increase in the activity of either PPC 121 or 122 is not propagated wholly to either motor neuron 131 or 132, because the initial synaptic weights are low, but instead gradually boosts the efficacy of these synaptic weights. The gradual increase of the synaptic weights results in a gradual activation of motor neurons 131 or 132, which, in turn, leads to a smooth increase or decrease of the actual value ($\theta$) of the joint control variable.

Facilitating synapses are synapses whose weight increases with an increase in received spikes. That is, the weight of the facilitating synapse 125 increases gradually upon receipt of spikes from the position control PPC 121. Similarly, the weight of the facilitating synapse 126 increases upon receipt of spikes from the position control PPC 122. As time passes without receiving spikes, the weight of the facilitating synapse 125 or 126 decreases, e.g., decays over time. The presynaptic spikes output by PPC 121 are scaled by the facilitating synapse 125 based on the weight of the facilitating synapse 125 before affecting the extensor motor neuron 131. Similarly, the presynaptic spikes output by PPC 122 are scaled by the facilitating synapse 126 based on the weight of the facilitating synapse 126 before affecting the flexor motor neuron 132.

In addition to the position control described above, the neuromorphic controller 100 also incorporates speed control, which is the first derivative of the actual value of the joint control variable. To incorporate speed control, the neuromorphic controller 100 includes an additional pair of speed control PPC neurons 123 and 124 whose firing activity encodes how the speed of the joint control variable varies. Notably, there is no target speed, as there is with position, as described above. The two PPC 123 and 124 fire in a mutually exclusive manner in response to negative or positive speed, respectively. The neuromorphic controller 100 includes a speed tracker 139 that keeps track of the change in the actual value of the joint control variable over time using a sliding window and estimates the first derivative of the speed of change of the joint control variable by computing the difference between the actual values of the joint control variable at the endpoints of that window and dividing by the length of the window, simulating the behavior of a digital differentiator. The speed tracker 139 transforms the speed value at every time instance to a current value (e.g., electric current value), using a concept similar to the CCMs 111-114 described above. More specifically, the speed tracker 139 translates the speed value to a current value via a linear transformation, which is then multiplied by the two opposite signs of the connections targeting the PPCs 123 and 124. Before feeding the currents into these neurons, the negative one is rectified to zero using a ReLU function and the respective neuron receives no current, while the positive current is directly fed to its respective neuron. The resulting current value is fed to PPCs 123 and 124 with opposite signs, to ensure mutually exclusive firing. In this way, when the estimated speed is positive, PPC 124 will be excited, while PPC 123 will be inhibited, and vice versa.

The inclusion of PPCs 123 and 124 in the neuromorphic controller 100 improves the smoothness of the control in a way that is explained by their connections to the motor neurons 131 and 132. Specifically, PPC 124, whose spiking indicates an increase in the speed of the actual value of the joint control variable is activating the flexor motor neuron 132 to decrease the actual value of the joint control variable. Therefore, PPCs 123 and 124 are counteracting the effect that their own activity indicates, introducing some push-pull dynamics that improve the control. The rationale behind these dynamics is the desire to have a timely deceleration of the actual value of the joint control variable when approaching the target value. Therefore, in this context, a large speed magnitude is a good indication for the network to start decelerating. The opposite effect is realized by the connection of PPC 123 to the extensor motor neuron 131.

The PSI neuron 129 further improves the control behavior, by introducing adaptive feedback, which minimizes the overshoot inflicted on the actual value of the joint control variable. The PSI neuron 129 is part of a feedback adaption stage 128 of the neuromorphic controller 100. The PSI neuron 130 adjusts a connection weight 141 used to weight the spikes output by the position control PPC 121, which may also be weighted by the facilitating synapse 125. The PSI neuron 130 also adjusts a connection weight 142 used to weight the spikes output by the position control PPC 122, which may also be weighted by the facilitating synapse 126.

The advantages of this PSI neuron 129 are shown when considering two extreme cases of difference between target and actual values of the joint control variable. When the difference between the target and actual values is small, the PSI neuron 129 provides a large connection weight 141 between PPC 121 and the extensor motor neuron 132 and/or a large connection weight 142 between PPC 122 and the flexor motor neuron 132, in order to propagate the low spiking activity of PPC 121 or PPC 122 to motor neurons 131 and 132 to decrease the difference between the target and actual values of the joint control variable.

However, with that weight selection configuration, when a really large difference between target and actual value appears, the network may not handle the previously selected weight ideally, giving rise to an overshoot past the target value of the joint control variable. The strong connection weight can drive the change in the current value and thus the spikes output by the PPCs 121 and 122 strongly and the network may not decelerate on time, leading to the overshoot.

With these two extreme cases in mind, it may be preferred to have the weight of that connection to be large when the network needs to cope with small differences, while getting smaller when facing larger changes. To introduce this kind of adaptive feedback, the PSI neuron 129 is included in the neuromorphic controller 100. The spiking activity of the PSI neuron 129 reflects the spiking activity of the error position of PPCs 121 and 122. In this way, the PSI neuron 129 fires intensively when the positional error is large, e.g., when one of the position control PPCs has high spiking activity, while it only fires slightly when the position error is small, when neither position control PPC has spiking activity (e.g., no output spikes) or the one that has spiking activity has low spiking activity (e.g., output spikes at less than a threshold rate). For example, the rate of spikes output by the PSI neuron 129 can be proportional to the rate of spikes being received by the PSI neuron from one of the position PPCs 121 or 122.

The spikes of the PSI neuron 129 are used to modulate the connection weight 141 between PPC 121 and the extensor motor neuron 131 and the connection weight 142 between PPC 122 and the flexor motor neuron 132. The weights 141 and 142 increase with an increase in spikes from the PSI neuron 129 and decrease with a decrease in spikes from the PSI neuron 129. The modulation of the weight is divisive, to simulate how presynaptic inhibition works in real synapses (increasing PSI activity induces a proportional decrease on the weight).

As described above, the extensor motor neuron 131 integrates the output spikes of PPC 121 and outputs spikes to the actuation signal generator 135 to increase the actual value ($\theta$) of the joint control variable to reach the target value ($\theta^d$) of the joint control variable. The flexor motor neuron 132 integrates the output spikes of PPC 122 and outputs spikes to the actuation signal generator 135 to decrease the actual value ($\theta$) of the joint control variable to reach the desired value ($\theta^d$). The actuation signal generator 135 translates the spikes into appropriate actuation signals, e.g., torques, and outputs the actuation signals to the actuator of the joint 150.

The actuation signal generator 135 translates spikes received from the extensor motor neuron 131 into actuation signals that cause the actuator of the joint 150 to move its links such that the actual value of the joint control variable increases. The amount of movement represented by each actuation signal can be proportional to the spiking activity of the extensor motor neuron 131. Similarly, the actuation signal generator 135 translates spikes received from the flexor motor neuron 132 into actuation signals that cause the actuator of the joint 150 to move its links such that the actual value of the joint control variable decreases. The amount of movement represented by each actuation signal can be proportional to the spiking activity of the flexor motor neuron 131.

The sensor 151 of the joint 150 can measure the actual value of the joint control variable and provide the actual value of the joint control variable to the neuromorphic controller 100. The neuromorphic controller can provide the actual value of the joint control variable to the CCMs 111-114 to continue generating actuation signals to control the joint.

Although the neuromorphic controller 100 includes two position control PPCs 121 and 122, two speed PPCs 123 and 124, two motor neurons 131 and 132, one of each of these components can be used for unidirectional control, e.g., only increasing the value of the joint control variable. In this example, the decrease can happen without control, e.g., decay with time.

Figure 2:
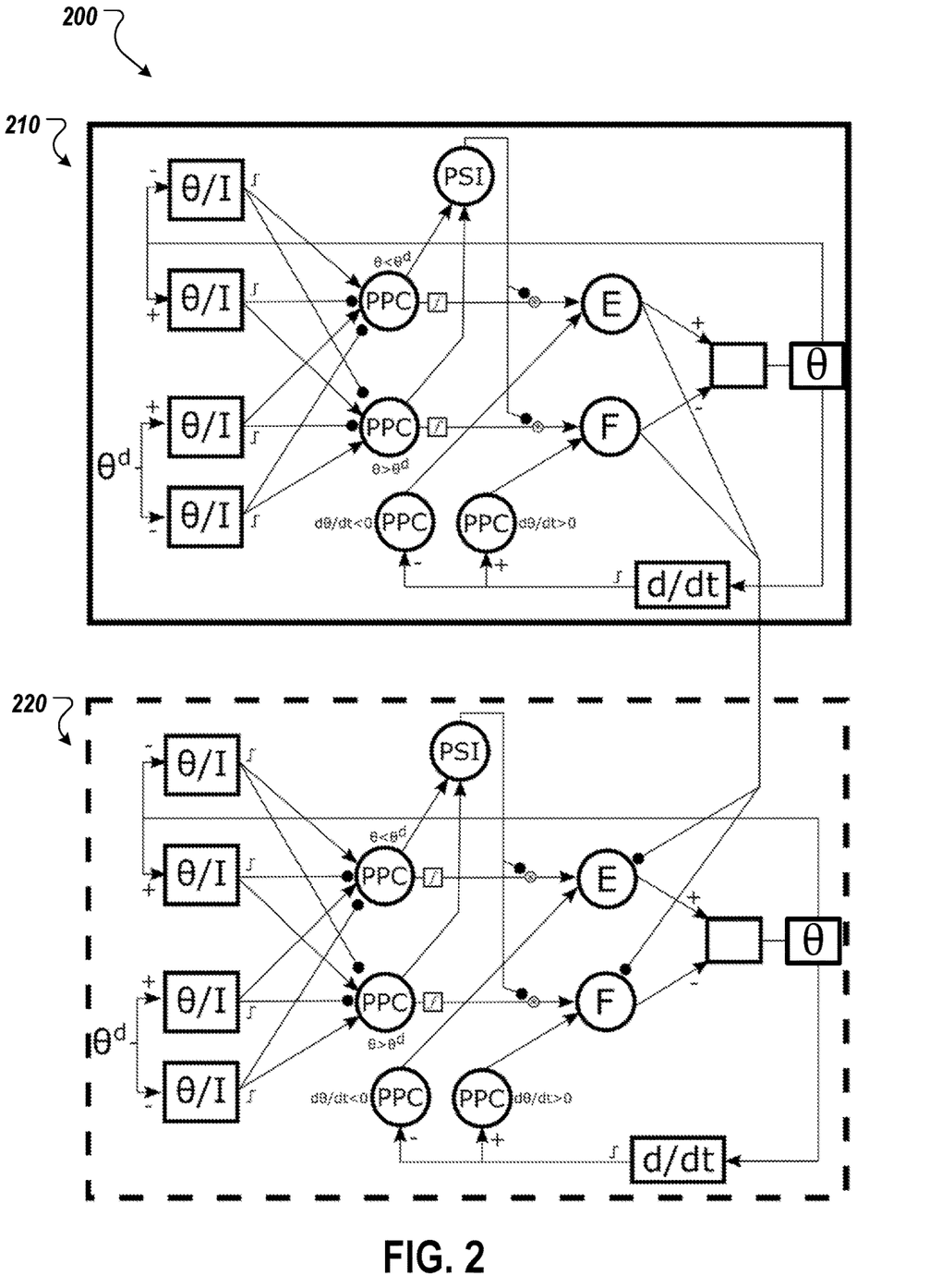
FIG. 2 depicts example neuromorphic controllers configured to provide coordinated smooth movement of two joints of a robotic arm.

FIG. 2 depicts an example neuromorphic controller 200 configured to provide coordinated smooth movement of two joints of a robotic arm. The example neuromorphic controller 200 includes a first neuromorphic controller 210 for controlling a first joint of a robotic arm and a second neuromorphic controller 220 for controlling a second joint of a robotic arm. The first and second neuromorphic controllers 210 and 220 include the same components as the neuromorphic controller 100 of FIG. 1 and can operate in a similar manner. However, the neuromorphic controllers 210 and 220 can coordinate movements to provide a smooth overall movement of the robotic arm. Although the example neuromorphic controller 200 includes two neuromorphic controllers 210 and 220, more controllers can be used for robotic arms having more than two joints. The neuromorphic controller 200 can be expanded to provided coordinated smooth movement of more than two joints as well, e.g., by including an individual neuromorphic controller for each joint and connecting the extensor and flexor motor neurons of adjacent joints.

In this example, the first neuromorphic controller 210 is used to control a primary joint and the second neuromorphic controller 220 is used to control a subordinate joint that is subordinate to the primary joint. This arrangement enables the neuromorphic controller 200 to control the subordinate joint based on the position and speed of the primary joint, which is similar to the biological control of animal and human joints. For example, the timing of flexion/extension of the wrist (subordinate joint) of a human is typically dependent on the movement of the elbow (primary joint). In particular the extensor or flexor of the wrist can have a 90 degree phase difference from the extensor or flexor of the elbow.

To mimic this relationship, the outputs of the extensor motor neuron and the flexor motor neuron of the first neuromorphic controller 210 are provided to the extensor motor neuron and the flexor motor neuron, respectively, of the second neuromorphic controller 220. The extensor and flexor motor neurons of the second neuromorphic controller 220 can be configured to adjust their outputs based on a combination of the outputs of its PPC neurons for the subordinate joint and whether and how much the primary joint is being flexed or extended. For example, if the primary joint is being transitioned from flex to extend, the extensor and flexor motor neurons of the second neuromorphic controller 220 can detect a change in the sign of the outputs of the extensor and flexor motor neurons of the first neuromorphic controller 210. In response, the extensor and flexor motor neurons of the second neuromorphic controller 220 can adjust the position of the subordinate joint to provide a smoother motion for the robotic arm, e.g., by making a similar transition between extend and flex as the primary joint at a later time to mimic the 90 degree phase difference.

A coordination controller can be used to coordinate the control of the subordinate joint based on movement of the primary joint. For example, the coordination controller can receive the signals output by the extensor and flexor motor neurons of the first neuromorphic controller 210. The coordination controller can then determine how to affect the control of the extensor and/or flexor motor neurons of the second neuromorphic controller 220 and send output signals, e.g., spikes, to the extensor and/or flexor motor neurons of the second neuromorphic controller 220. In this way, the coordination between two joints is flexible and configurable for various use cases.

Figure 3:
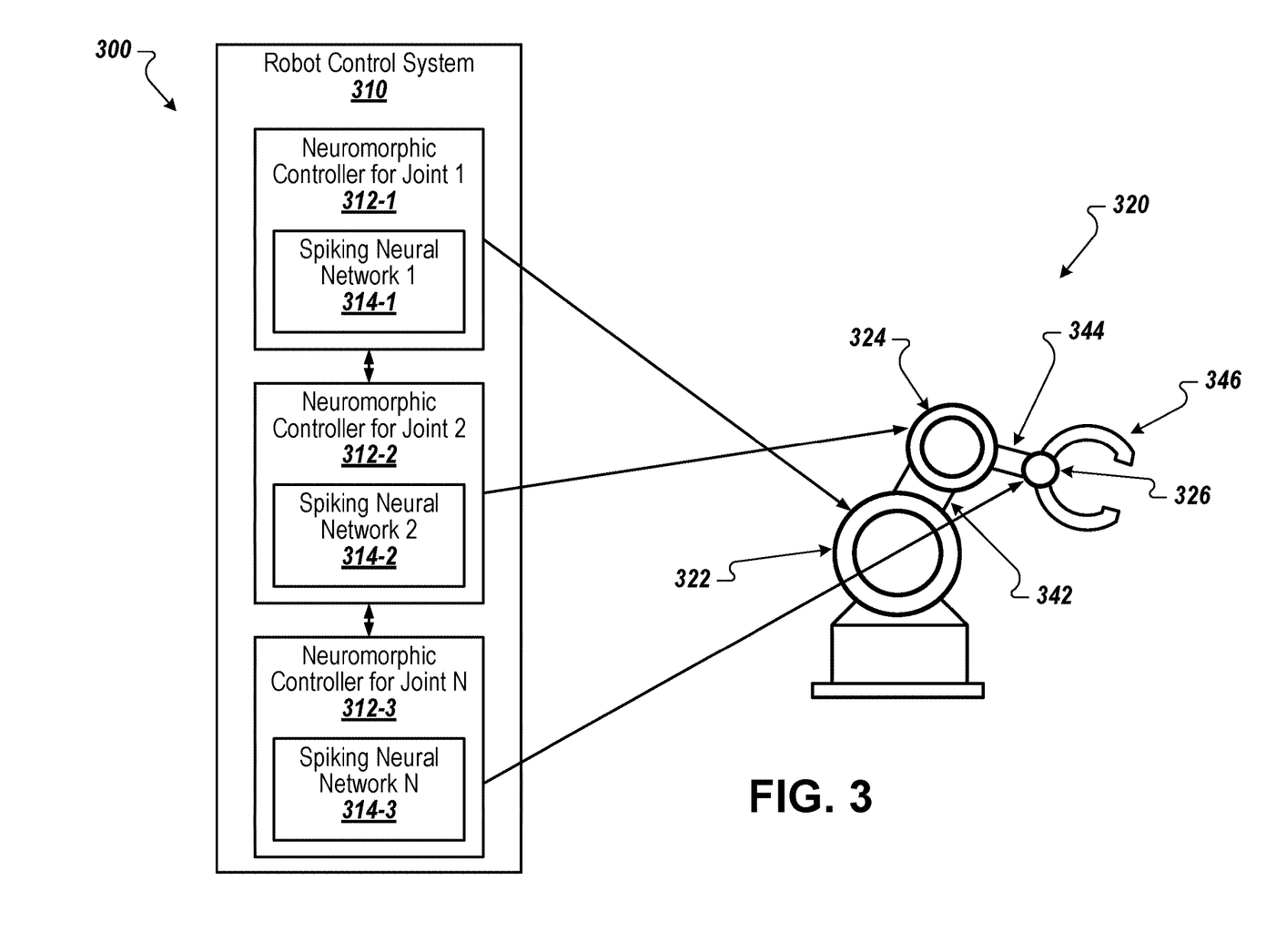
FIG. 3 depicts an environment in which a robot controller controls the joints of a robotic arm.

FIG. 3 depicts an environment 300 in which a robot control system 310 controls the joints of a robotic arm 320. In this example, the robotic arm 320 has three joints 322, 324, and 326. The joint 322 adjusts the position of a link 342 between the joint 322 and the joint 324. For example, the joint 322 can rotate the link 342 about an axis. The joint 324 adjusts the position of a link 344 between the joint 324 and an end effector 346. For example, the joint 324 can rotate the link 344 about an axis. The joint 326 can adjust the end effector 346, e.g., by rotating the end effector 346.

The robot control system 310 includes a neuromorphic controller 312 for each joint of the robotic arm 320. A neuromorphic controller 312-1 can control the joint 322 by sending actuation signals to an actuator of the joint 322. Similarly, a neuromorphic controller 312-2 can control the joint 324 by sending actuation signals to an actuator of the joint 324 and a neuromorphic controller 314-3 can control the joint 326 by sending actuation signals to an actuator of the joint 326.

Each neuromorphic controller 312 includes an SNN 314 that can be implemented using the neuromorphic controller 100 of FIG. 1 or a neuromorphic controller similar thereto. For example, one or more of the neuromorphic controllers 312 can include a PSI neuron while others may not.

In some implementations, each neuromorphic controller 312 can control its joint independent of each other neuromorphic controller 312. That is, the robot control system 310 may not coordinate the control of joints.

In some implementations, two or more of the neuromorphic controllers 312 can coordinate control of their joints. In this example, the joint 322 would be the primary joint and the joint 324 is subordinate to joint 322. In addition, the joint 326 is subordinate to joint 324. The neuromorphic controller 312-2 can control the joint 324 in coordination with the neuromorphic controller 312-1. For example, the neuromorphic controllers 312-1 and 312-2 can be connected in the same or a similar manner as the neuromorphic controllers 210 and 220 of FIG. 2. In this way, the link 344 and be moved based on the movement of the link 342. For example, the link 344 can be moved using a 90 degree phase shift, as described above. The neuromorphic controller 312-3 can control the joint 326 in coordination with the neuromorphic controller 312-1 or the neuromorphic controller 312-2, or without coordination with either controller.

Figure 4:
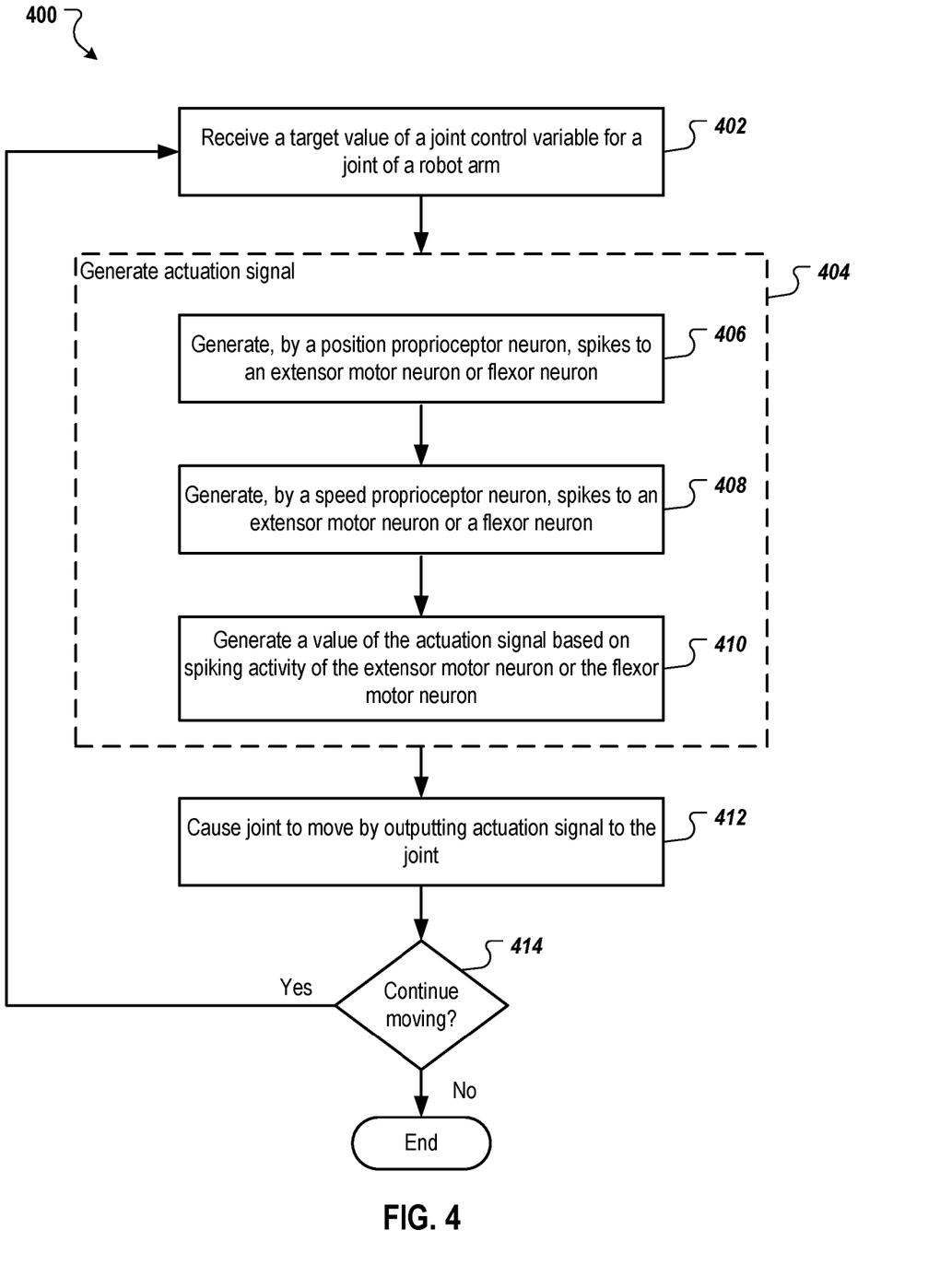
FIG. 4 is a flow diagram of an example process for controlling a joint of a robotic arm.

FIG. 4 is a flow diagram of an example process 400 for controlling a joint of a robotic arm. The process 400 can be performed by a robot control system that includes a neuromorphic controller, such as the robot control system 310 of FIG. 3 or the neuromorphic controller 100 of FIG. 1. For brevity, the operations of the process are described as being performed by a neuromorphic controller, which can be implemented on a computer or in special-purpose circuitry as described above.

The neuromorphic controller receives a target value of a joint control variable for a joint of a robotic arm (402). The joint control variable can be any scalar amount, such as the angle of a revolute joint, or the length of a prismatic joint, or the angular speed/linear speed of a motor. In some implementations, the target value of the joint control variable is determined based on user input. For example, the neuromorphic controller or another component can determine the target value for the joint control variable for a joint based on input from a user through a joystick, using voice input through a speech recognition engine, or from a camera using object recognition.

As described above, the neuromorphic controller can include an SNN. The SNN can include position control proprioceptor neurons, speed control proprioceptor neurons, an extensor motor neuron, and a flexor motor neuron. For example, the SNN can include two position control proprioceptor neurons and two speed control proprioceptor neurons, as shown in FIG. 1. In some implementations, the SNN also includes a PSI neuron.

The neuromorphic controller generates an actuation signal based on a difference between the target value of the joint control variable and actual value of the joint control variable (404). This updating can be performed using the SNN and can include constituent operations 406-410.

One of the position control proprioceptor neurons generates the first spikes to one of the extensor motor neuron or the flexor motor neuron based on a difference between the actual value of the joint control variable and the target value of the joint control variable (406). As described above, each position control proprioceptor neuron receives current pulse inputs from CCMs based on the sign of the actual and target values of the joint control variables and the difference between the actual value of the joint control variable and the target value of the joint control variable. When the actual value is greater than the target value, a first position control proprioceptor neuron can output spikes to the extensor motor neuron. When the actual value is less than the target value, a second position control proprioceptor neuron can output spikes to the flexor motor neuron. The operation of the position control proprioceptor neurons is described with reference to FIG. 1.

One of the speed control proprioceptor neurons generates the second spikes to one of the extensor motor neuron or the flexor motor neuron based on whether a change in speed of movement of the joint of the robotic arm is positive or negative (408). When the change in speed is positive, a first speed control proprioceptor neuron can output spikes to the flexor neuron. When the change in speed is negative, a second first speed control proprioceptor neuron can output spikes to the extensor neuron. The operation of the speed control proprioceptor neurons is described with reference to FIG. 1.

The neuromorphic controller generates a value of the actuation signal based on spiking activity of the extensor motor neuron or the flexor motor neuron (410). The spiking activity of the proprioceptor neurons can cause one of the extensor motor neuron or the flexor motor neuron to output spikes. If the extensor motor neuron outputs spikes, an actuation signal generator can translate the spikes into an actuation signal that causes the joint to move such that the actual value of the joint control variable increases. If the flexor motor neuron spikes, the actuation signal generator can translate the spikes into an actuation signal that causes the joint to move such that the actual value of the joint control variable decreases.

As described above, if a PSI neuron is included, the PSI neuron can adjust the connection weights between one of the position control proprioceptor motor neurons and the extensor motor neuron and/or the connection weights between one of the position control proprioceptor motor neurons and the flexor motor neuron. The adjustment to the weights can be based on spiking activity of the PSI neuron, which can be based on a difference between the target value of the joint control variable and the actual value of the joint control variable.

The neuromorphic controller causes the joint to move by outputting the actuation signal to the joint (412). The actuator of the joint causes the joint to move in response to the actuation signal.

A determination is made whether to continue moving the robotic arm (414). This determination can be based on whether the joint has moved such that the actual value of the joint control variable matches the target value for the joint control variable. If so, the neuromorphic controller can determine to end the movement of the joint, e.g., until a new target value for the joint control variable is received. If not, the process 400 can return to operation 402 at which a new target value is received or to operation 404 where the neuromorphic controller continues moving the joint until the actual value matches the target value.

Figure 5:
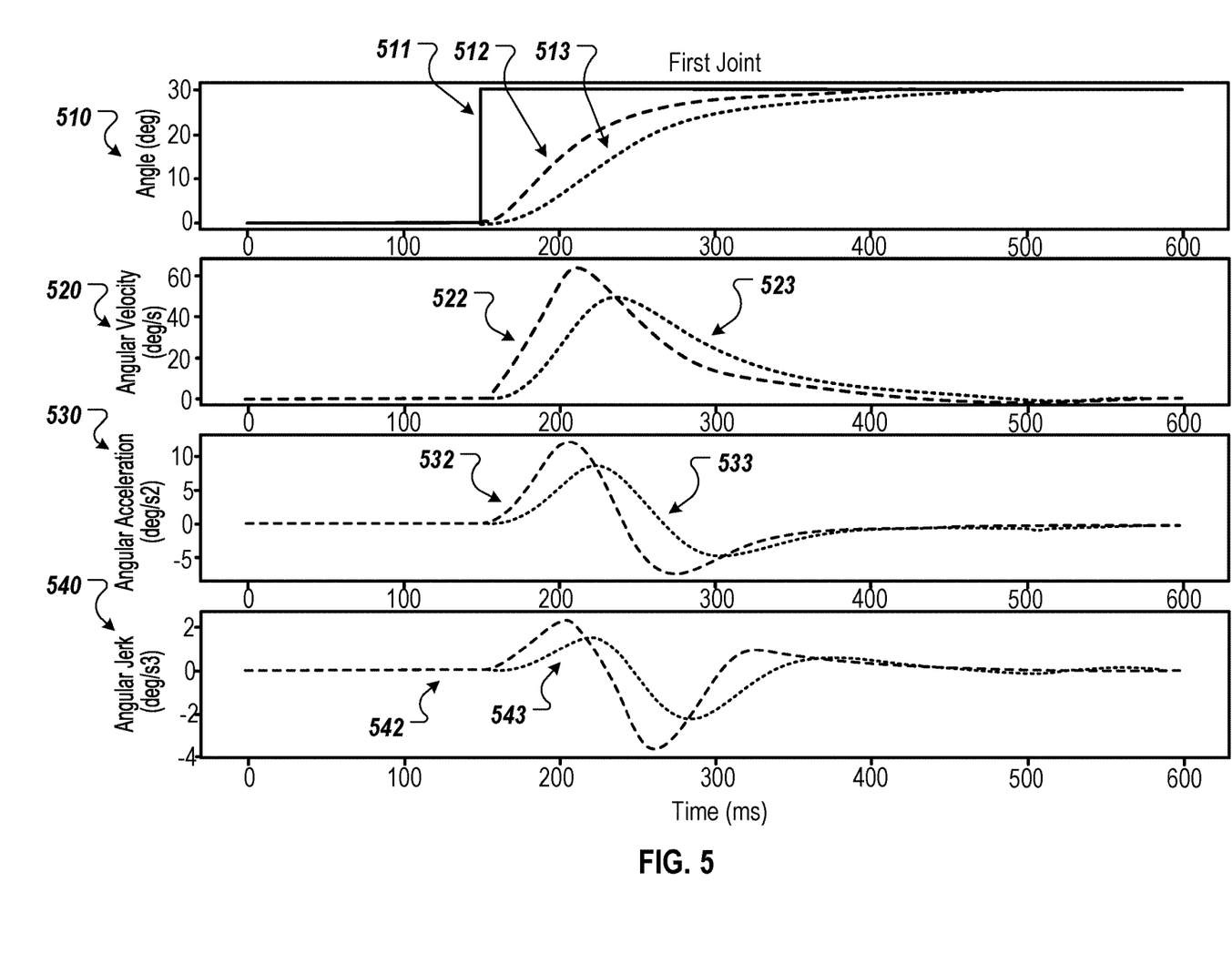
FIG. 5 depicts graphs that illustrate some advantages of using a neuromorphic controller to control a joint of a robotic arm.

FIG. 5 depicts graphs that illustrate some advantages of using a neuromorphic controller to control a joint of a robotic arm. The graphs illustrate the differences in changes of a joint based on a change in a target angle 512 of the joint from about zero degrees to about 30 degrees.

The graph 510 shows a comparison between a non-facilitating movement 512 of joint without using a neuromorphic controller and facilitating movement 513 of the joint using a neuromorphic controller. As shown in the graph 510, the facilitating movement 513 has a more gradual increase in the angle relative to the non-facilitating movement 512, which can be caused by the PSI neuron and/or the facilitating synapses adjusting the connection weight to the motor neurons. As the joint approaches the target angle, the rate of change of the angle slows down in the non-facilitating movement, which can be caused by the speed control PPC neurons and/or the adjustment to the connection weights. This provides a smoother motion by reducing any jerking motions at the beginning and end of the transition between angles.

The graph 520 shows a comparison between the angular velocity of the non-facilitating movement 522 of the joint without using a neuromorphic controller and the angular velocity of the facilitating movement 523 of the joint using a neuromorphic controller. Similar to the change in the angle shown in the graph 510, this graph 520 shows that the change in angular velocity increases and decreases more gradually in the facilitating movement 523 than in the non-facilitating movement 522.

The graph 530 shows a comparison between the angular acceleration of the non-facilitating movement 532 of the joint without using a neuromorphic controller and the angular acceleration of the facilitating movement 533 of the joint using a neuromorphic controller. The facilitating movement 533 has a more gradual increase in angular acceleration and a more gradual decrease in angular acceleration than the non-facilitating movement 532. The peak accelerations of the facilitating movement 533 are also lower in magnitude than the peak accelerations of the non-facilitating movement 532, which demonstrates the smoother and less abrupt motions of the facilitating movement 533 as compared to the non-facilitating movement 532. The reduction in angular jerk is shown in the graph 540. This graph 540 shows that the angular jerk of the facilitating movement 543 is less than the angular jerk of the non-facilitating movement.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array), an ASIC (application specific integrated circuit), a neuromorphic research chip, such as Intel's Loihi chip, or a neural network processor, such as BrainChip's Akida™ chip. The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input.

An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit) a neuromorphic research chip, such as Intel's Loihi chip, or a neural network processor, such as BrainChip's Akida™ chip.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for controlling one or more joints of a robotic arm, the method comprising:
   receiving, by a neuromorphic controller comprising a spiking neural network (SNN), a target value of a joint control variable for a joint of the robotic arm, wherein the SNN comprises position control proprioceptor neurons, speed control proprioceptor neurons, an extensor motor neuron, and a flexor motor neuron;

generating, by the neuromorphic controller, an actuation signal that causes the joint of the robotic arm to move based on a difference between the target value of the joint control variable and an actual value of the joint control variable, the generating comprising, generating, by one of the position control proprioceptor neurons, first spikes to one of the extensor motor neuron or the flexor motor neuron based on a difference between the actual value of the joint control variable and the target value of the joint control variable, generating, by one of the speed control proprioceptor neurons, second spikes to one of the extensor motor neuron or the flexor motor neuron based on whether a change in speed of movement of the joint of the robotic arm is positive or negative, and generating a value of the actuation signal based on spiking activity of the extensor motor neuron or the flexor motor neuron; and causing the joint to move by outputting the actuation signal to the joint.

2. The method of claim 1, wherein generating, by one of the position control proprioceptor neurons, a first spike to one of the extensor motor neuron or the flexor motor neuron based on a difference between the actual value of the joint control variable and the target value of the joint control variable comprises:

determining, by a first position control proprioceptor neuron, that the actual value of the joint control variable is less than the target value of the joint control variable and, in response, generating the first spikes to the extensor motor neuron; or determining, by a second position proprioceptor neuron, that the actual value of the target control variable is greater than the target value of the joint control variable and, in response, generating the first spikes to flexor motor neuron.

3. The method of claim 2, wherein a quantity of the first spikes is based on a magnitude of the difference between the actual value of the joint control variable and the target value of the joint control variable.

4. The method of claim 1, wherein generating, by one of the speed control proprioceptor neurons of the SNN, the second spikes to one of the extensor motor neuron or the flexor motor neuron based on whether a change in speed of movement of the joint of the robotic arm is positive or negative comprises:

determining, by a first speed control proprioceptor neuron, that the change in speed of movement of the joint of the robotic arm is positive and, in response, generating the second spikes to the flexor motor neuron; or determining, by a second speed control proprioceptor neuron, that the change in speed of movement of the joint of the robotic arm is negative and, in response, generating the second spikes to the extensor motor neuron.

5. The method of claim 1, wherein updating the actual value of the joint control variable based on spiking activity of the extensor motor neuron or the flexor motor neuron comprises reducing a speed of movement of the joint as the actual value of the target control variable joint approaches to the target value of the target control variable.

6. The method of claim 1, further comprising adjusting, by a presynaptic inhibitory (PSI) neuron of the SNN, at least one of (i) a first connection weight between the first position control proprioceptor neuron and the extensor motor neuron or (ii) a second connection weight between the second position control proprioceptor neuron and the flexor motor neuron.

7. The method of claim 6, wherein the PSI neuron adjusts the first connection weight and/or the second connection weight based on a difference between the target value of the joint control variable and the actual value of the joint control variable.

8. The method of claim 1, further comprising updating, by an additional neuromorphic controller for an additional joint of the robotic arm, an additional actual value of an additional joint control variable of the additional joint based on a target value of the additional joint control variable, on whether a change in speed of movement of the additional joint of the robotic arm is positive or negative, and at least one of (i) spikes generated by the extensor motor neuron of the neuromorphic controller or (ii) spikes generated by the flexor motor neuron of the neuromorphic controller.

9. The method of claim 8, further comprising coordinating, by the additional neuromorphic controller, movement of the additional joint based on movement of the joint.

10. The method of claim 1, further comprising determining the target value of the joint control variable of the joint of the robotic arm based on user input received from one of (i) a joystick, (ii), a speech recognition image, or (iii) a camera.

11. A system comprising:

a robotic arm comprising one or more joints; and one or more neuromorphic processors comprising a neuromorphic controller comprising a spiking neural network (SNN), the neuromorphic processor being configured to perform operations comprising:

receiving a target value of a joint control variable for a joint of the robotic arm, wherein the SNN comprises position control proprioceptor neurons, speed control proprioceptor neurons, an extensor motor neuron, and a flexor motor neuron;

generating actuation signal that causes the joint of the robotic arm to move based on a difference between the target value of the joint control variable and an actual value of the joint control variable, the generating comprising, generating, by one of the position control proprioceptor neurons, first spikes to one of the extensor motor neuron or the flexor motor neuron based on a difference between the actual value of the joint control variable and the target value of the joint control variable, generating, by one of the speed control proprioceptor neurons, second spikes to one of the extensor motor neuron or the flexor motor neuron based on whether a change in speed of movement of the joint of the robotic arm is positive or negative, and generating a value of the actuation signal based on spiking activity of the extensor motor neuron or the flexor motor neuron; and causing the joint to move by outputting the actuation signal to the joint.

12. The system of claim 11, wherein generating, by one of the position control proprioceptor neurons, a first spike to one of the extensor motor neuron or the flexor motor neuron based on a difference between the actual value of the joint control variable and the target value of the joint control variable comprises:
- determining, by a first position control proprioceptor neuron, that the actual value of the joint control variable is less than the target value of the joint control variable and, in response, generating the first spikes to the extensor motor neuron; or
- determining, by a second position proprioceptor neuron, that the actual value of the target control variable is greater than the target value of the joint control variable and, in response, generating the first spikes to flexor motor neuron.

13. The system of claim 12, wherein a quantity of the first spikes is based on a magnitude of the difference between the actual value of the joint control variable and the target value of the joint control variable.

14. The system of claim 11, wherein generating, by one of the speed control proprioceptor neurons of the SNN, the second spikes to one of the extensor motor neuron or the flexor motor neuron based on whether a change in speed of movement of the joint of the robotic arm is positive or negative comprises:
- determining, by a first speed control proprioceptor neuron, that the change in speed of movement of the joint of the robotic arm is positive and, in response, generating the second spikes to the flexor motor neuron; or
- determining, by a second speed control proprioceptor neuron, that the change in speed of movement of the joint of the robotic arm is negative and, in response, generating the second spikes to the extensor motor neuron.

15. The system of claim 11, wherein updating the actual value of the joint control variable based on spiking activity of the extensor motor neuron or the flexor motor neuron comprises reducing a speed of movement of the joint as the actual value of the target control variable joint approaches to the target value of the target control variable.

16. The system of claim 11, wherein the operations comprise adjusting, by a presynaptic inhibitory (PSI) neuron of the SNN, at least one of (i) a first connection weight between the first position control proprioceptor neuron and the extensor motor neuron or (ii) a second connection weight between the second position control proprioceptor neuron and the flexor motor neuron.

17. The system of claim 16, wherein the PSI neuron adjusts the first connection weight and/or the second connection weight based on a difference between the target value of the joint control variable and the actual value of the joint control variable.

18. The system of claim 11, wherein the operations comprise updating, by an additional neuromorphic controller for an additional joint of the robotic arm, an additional actual value of an additional joint control variable of the additional joint based on a target value of the additional joint control variable, on whether a change in speed of movement of the additional joint of the robotic arm is positive or negative, and at least one of (i) spikes generated by the extensor motor neuron of the neuromorphic controller or (ii) spikes generated by the flexor motor neuron of the neuromorphic controller.

19. The system of claim 18, wherein the operations comprise coordinating, by the additional neuromorphic controller, movement of the additional joint based on movement of the joint.

20. A non-transitory computer readable medium carrying instructions that, when executed by one or more processors, cause the one or more processors to perform operations comprising:
- receiving, by a neuromorphic controller comprising a spiking neural network (SNN), a target value of a joint control variable for a joint of a robotic arm, wherein the SNN comprises position control proprioceptor neurons, speed control proprioceptor neurons, an extensor motor neuron, and a flexor motor neuron;
- generating, by the neuromorphic controller, an actuation signal that causes the joint of the robotic arm to move based on a difference between the target value of the joint control variable and an actual value of the joint control variable, the generating comprising,
  - generating, by one of the position control proprioceptor neurons, first spikes to one of the extensor motor neuron or the flexor motor neuron based on a difference between the actual value of the joint control variable and the target value of the joint control variable,
  - generating, by one of the speed control proprioceptor neurons, second spikes to one of the extensor motor neuron or the flexor motor neuron based on whether a change in speed of movement of the joint of the robotic arm is positive or negative, and
  - generating a value of the actuation signal based on spiking activity of the extensor motor neuron or the flexor motor neuron; and
- causing the joint to move by outputting the actuation signal to the joint.

* * * * *